DIAL ILLUMINATION CIRCUITRY

Filed Oct. 21, 1965

WITNESSES:

Bernard R. Gieguez

James F. Young

INVENTORS
Gustave A. Knorr, Jr. &
Jing-Jue Young
BY
A. Samuel Oddi
ATTORNEY 3,427,503

DIAL ILLUMINATION CIRCUITRY

Gustave A. Knorr, Jr., Atlantic Highlands, and Jing-Jue Young, Elizabeth, N.J., assignors to Westinghouse Electric Corporation, Pittsburgh, Pa., a corporation of Pennsylvania Filed Oct. 21, 1965, Ser. No. 499,495

U.S. Cl. 315—324 2 Claims

Int. Cl. H05b 37/02, 39/04

The present invention relates to dial illumination circuitry, and more particularly to dial illumination circuitry for use with VHF-UHF tuners.

The standardized use of both VHF and UHF tuners in presently produced television receivers has made it desirable to provide separate dial illumination for the particular tuner in operation. A common method of providing dial illumination for the tuners is the use of an incandescent bulb for each of the tuner dials with the associated switching circuitry. The requirement for additional switching circuitry for each of the tuning mechanisms, of course, increases the complexity and the cost of the television receiver. It would therefore be highly desirable to provide a dial illumination circuit utilizing existing switching circuitry while still providing the necessary dial illumination for both the UHF and VHF tuners.

It is, therefore, an object of the present invention to provide a new and improved dial illumination circuit.

It is a further object of the present invention to provide new and improved UHF-VHF dial illumination circuitry which utilizes existing switching circuitry of the tuners.

It is a further object of the present invention to provide a new and improved UHF-VHF dial illumination circuit which is readily adaptable for variations in the illumination function for either or both of the tuner dials.

Broadly, the present invention provides a dial illumination circuit for UHF and VHF tuners having a tuning switch for selecting one of the tuners to be operative wherein a VHF dial indicator light is illuminated when the switch is in the VHF position and a UHF dial indicator light is illuminated when the switch is in the UHF position.

These and other objects and advantages of the present invention will become more apparent when considered in view of the following specification and drawings, in which.

Figure 1:
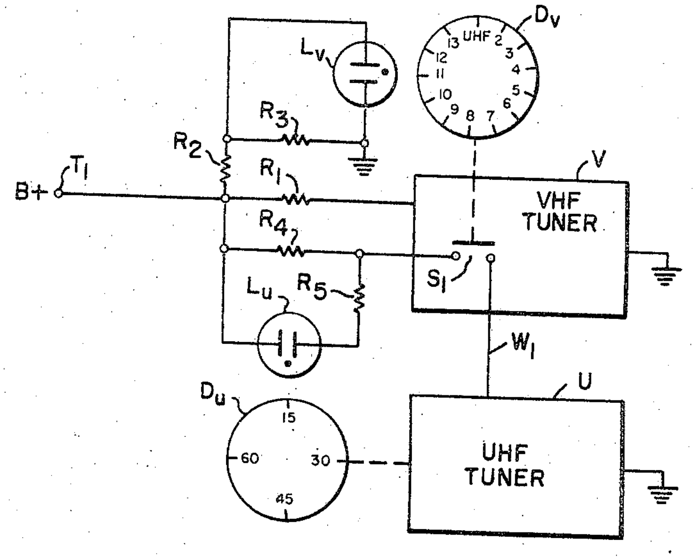
FIGURE 1 is a schematic diagram of one embodiment of the present invention.

Referring to FIG. 1, one embodiment of the dial illumination circuit of the present invention for use in a television receiver is shown utilizing a VHF dial illuminator light $L_v$ to illuminate a VHF dial $D_v$ and a UHF dial illuminator light $L_u$ to illuminate a UHF dial $D_u$. The dial illuminator lights $L_v$ and $L_u$ may each, for example, comprise a gas filled bulb such as a neon bulb. As is well known in the art, neon bulbs have a predetermined ionization potential which must be applied across the bulb to ionize gas within the bulk so as to emit light therefrom. The neon bulb will continue to emit light until the potential applied thereacross is reduced below an extinguishing potential. In a typical neon bulb, which could be used in the circuit of FIG. 1, the ionization potential would be, for example, approximately 90 volts, while the extinguishing voltage would be approximately 60 volts. In the example of FIG. 1, it is assumed that the illuminator lights $L_v$ and $L_u$ are neon bulbs having characteristics as described above.

In FIG. 1, the VHF tuner is shown schematically by a block V and UHF tuner is shown schematically by a block U. The VHF dial $D_v$ and the UHF dial $D_u$ are mechanically coupled to the tuners V and U, respectively, to indicate the particular channel to which the receiver is tuned. The VHF tuner V has included therein a switch $S_1$ which is a normal component of the VHF-UHF tuner combination. The VHF tuner V is operative with the switch $S_1$ in its open position, as shown, and the UHF tuner U is out of the B+ supply circuit. The closing of the switch $S_1$ causes the UHF tuner U to be placed into the B+ supply circuit so that UHF television channels may be received. In a typical mechanical implementation of the tuner combination, the switch $S_1$ will be open for channel positions 2 through 13 and will be closed by the positioning of the VHF channel control knob at the space between channels 2 and 13.

For proper operation of the dial illumination circuit, when the switch $S_1$ is in its open VHF position, it is desired that the VHF illuminator bulb $L_v$ be illuminated, and when the switch $S_1$ is closed that the UHF indicator bulb $L_u$ be illuminated. These conditions are met in the circuit of FIG. 1 as may be seen from the following. Assume initially that the switch $S_1$ is in its open state as shown. Supply potential is supplied to the VHF tuner V from a source of B+ potential, to be connected to a terminal $T_1$, through a resistor $R_1$. With supply potential supplied to the VHF tuner and the switch $S_1$ in its open state, the VHF tuner will be operative to receive television signals in the VHF frequency band. Connected between the B+ terminal $T_1$ and ground is a voltage divider including the series connected resistors $R_2$ and $R_3$. Connected across the resistor $R_3$ of the voltage divider is the VHF dial illuminator bulb $L_v$. Between the B+ terminal $T_1$ and one end of the switch $S_1$ in the VHF tuner V, a voltage developing resistor $R_4$ is connected. The UHF dial illuminator bulb $L_u$ is connected in series with a current limiting resistor $R_5$, with the series combination of the UHF light $L_u$ and the resistor $R_5$ being connected directly across the voltage developing resistor $R_4$. The other end of the switch $S_1$ is connected to the UHF tuner U by a lead $W_1$, with both the UHF tuner U and the VHF tuner V having ground connections.

The voltage developed across the VHF bulb $L_v$ is determined by the voltage divider ratio:

$$\frac{R_3}{R_2+R_3}$$

times the B+ potential. The resistive values of the resistors $R_2$ and $R_3$ are designed in view of the B+ potential so that the ignition voltage of the light $L_v$ is exceeded. The ignition value of $L_v$ being exceeded, the bulb $L_v$ will provide a light output which will illuminate the VHF tuner dial $D_v$ of the television receiver. Since the voltage divider $R_2$, $R_3$ is connected directly across the B+ line, the light $L_v$ will remain illuminated independently of the position of the switch $S_1$. That is, if the switch $S_1$ is closed to its UHF position the same potential will be applied across the VHF illuminator bulb $L_v$ so that the bulb will remain illuminated. In many instances it is desirable that the VHF indicator bulb be illuminated even when the UHF tuner is to be operative, since the VHF tuner bulb $L_v$ may act as an indication that the UHF channel band is being utilized.

With the switch $S_1$ in its open position, no voltage is developed across the resistor $R_4$ connected across the UHF dial illuminator bulb $L_u$ and the resistor $R_5$, since an open circuit exists between the B+ source and ground at the other end of the switch $S_1$. Since no voltage is developed across the indicator light $L_u$ with the switch $S_1$ open, the light $L_u$ will be in its de-energized state and will emit no light therefrom. When, however, the switch $S_1$ is closed, a completed circuit is provided from the B+ source through the resistor $R_4$, the switch $S_1$ to the UHF tuner to ground, so that a voltage drop is developed across the resistor $R_4$ and the series combination of the UHF illuminator bulb $L_u$ and resistor $R_5$. The resistive values of the resistors $R_4$ and $R_5$ are so selected that the ionizing potential of the neon bulb $L_u$ is exceeded when the switch $S_1$ is placed in its closed position. The UHF dial illuminator light $L_u$ remains ignited as long as the switch $S_1$ is closed. To extinguish the light $L_u$ the switch $S_1$ is opened so that no voltage drop is developed across the resistor $R_4$. The VHF illuminator bulb $L_v$, however, remains illuminated independently of the position of the switch $S_1$, and stays in an ignited state until the B+ potential is removed from the circuit by, for example, turning off the television receiver. The resistor $R_5$ in series with the UHF dial light $L_u$ acts to limit the current through the bulb $L_u$ to maintain a reasonable lifetime for the bulb. Similarly, the voltage divider resistor $R_2$ acts to limit the current passing through the VHF dial illuminator bulb $L_v$.

FIG. 1 thus functions so that the VHF dial illuminator light $L_v$ is illuminated with the switch in either its VHF or UHF tuner position, but with the UHF illuminator bulb $L_u$ being illuminated only when the switch $S_1$ is in its closed UHF position.

Figure 2:
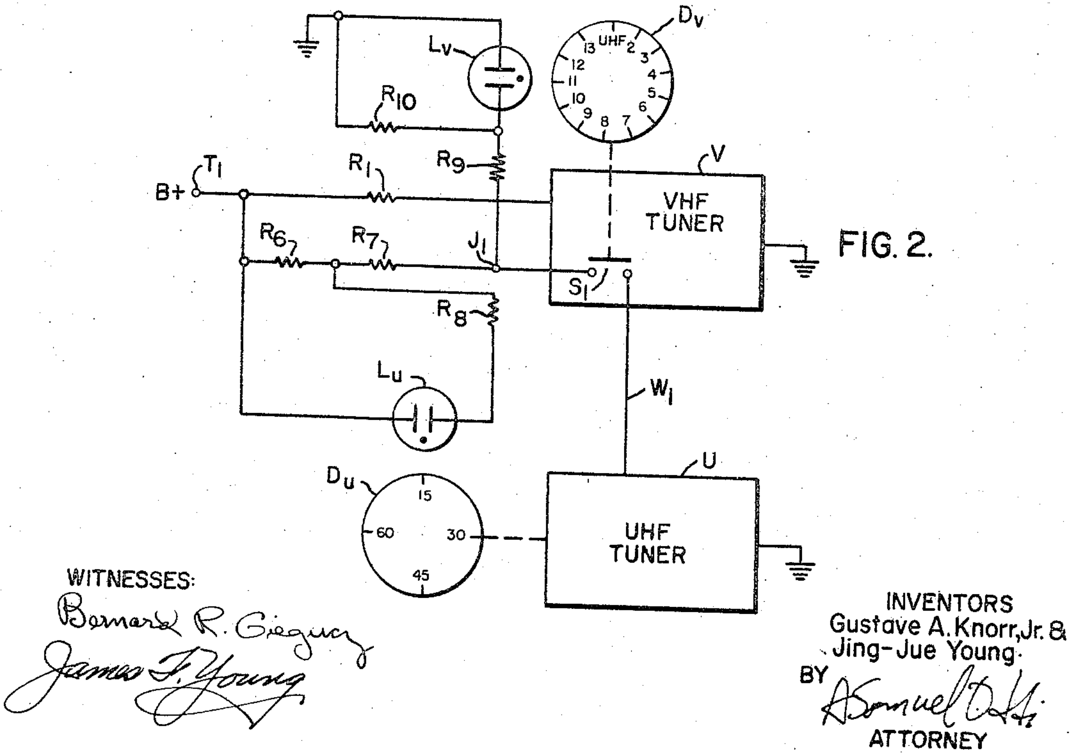
FIG. 2 is a schematic diagram of another embodiment of the present invention.

FIG. 2 shows another embodiment of the present invention wherein the VHF dial illuminator bulb $L_v$ is energized to provide light only when the switch $S_1$ is in its opened VHF position. The UHF illuminator bulb $L_u$ functions as in FIG. 1 to provide light only when the switch $S_1$ is in its closed UHF position. These functions may be seen from the following. Assume initially that the switch $S_1$ is in its opened VHF position. A B+ potential will be supplied as in FIG. 1, from the terminal $T_1$ through the resistor $R_1$ to the VHF tuner V. A voltage developing resistor $R_6$ is connected between terminal $T_1$ and one end of a resistor $R_7$. The UHF light $L_u$ is connected in series with a current limiting resistor $R_8$, with the series combination being connected across the voltage developing resistor $R_6$. At the other end of the resistor $R_7$, at a junction $J_1$, a voltage divider including a resistor $R_9$ and a resistor $R_{10}$ is connected between the junction $J_1$ and ground. The VHF dial illuminator bulb $L_v$ is connected across the resistor $R_{10}$. The junction $J_1$ is connected to one end of the switch $S_1$ and the other end of the switch $S_1$ is connected through a lead $W_1$ to the UHF tuner U. Both tuners V and U have a ground connection to complete the circuit. Disposed to be illuminated by the VHF and UHF lights $L_v$ and $L_u$, respectively, are the tuner dials, $D_v$ and $D_u$, which are, respectively, mechanically coupled to the tuners V and U.

With the switch $S_1$ open as shown in FIG. 2, the voltage developed at the junction $J_1$ with respect to ground will be substantially high; that is, near the B+ potential. The resistive values of the resistors $R_6$, $R_7$, $R_9$ and $R_{10}$ are so selected that with the switch $S_1$ open, a voltage sufficient to ignite the neon bulb $L_v$ is developed across the resistor $R_{10}$. The VHF dial bulb $L_v$ is thus ignited and continues to provide dial illumination as long as the switch $S_1$ remains in the open position.

The resistive value of the resistor $R_6$ is so selected in relation to the other circuit components that voltage developed thereacross with the switch $S_1$ in its open position is insufficient to ignite the UHF illuminator bulb $L_u$. In other words, the voltage developed across the VHF illuminator bulb $L_v$, which is proportional to the ratio $$\frac{R_{10}}{R_6+R_7+R_9+R_{10}}$$

is of sufficient magnitude to ignite the bulb $L_v$; however, the voltage developed across the UHF illuminator bulb $L_u$, which is proportional to the ratio $$\frac{R_6}{R_6+R_7+R_9+R_{10}}$$

is insufficant to ignite the bulb $L_u$.

When UHF tuner operation is desired, the switch $S_1$ is closed. This supplies a potential to the UHF tuner from the B+ source through the resistors $R_6$, $R_7$, the switch $S_1$ and the lead $W_1$ to the tuner U. At this time it is desired that the UHF illuminator bulb $L_u$ be ignited and the VHF illuminator bulb be de-energized. This is accomplished since the closing of the switch $S_1$ provides a relatively low impedance path across the voltage divider including the resistors $R_9$ and $R_{10}$. Therefore, the voltage from the junction $J_1$ to ground drops, with the voltage provided across the VHF illuminator bulb $L_v$ correspondingly dropping to a level below the extinguishing level of the bulb $L_v$. Since a relatively small voltage drop is provided between the junction $J_1$ and ground, a relatively high voltage drop is provided across the resistor $R_6$. The circuit components are so designed that a sufficient voltage is developed across the UHF illuminator bulb $L_u$ to cause this light to ignite. Thus, the VHF bulb $L_v$ is de-energized since a relatively low voltage is provided thereacross with the switch $S_1$ being closed, and the UHF bulb $L_u$ is energized by the high voltage developed across the resistor $R_6$, which in turn provides a sufficient igniting voltage across the UHF bulb $L_u$.

The UHF light $L_u$ is illuminated and the VHF light $L_v$ is deenergized as long as the switch $S_1$ is maintained in its closed position. If VHF tuner operation is again desired, the switch $S_1$ is opened. This causes the voltage level at the junction $J_1$ to increase thereby increasing the potential across the VHF bulb $L_v$ to above its ignition potential causing it to emit light. Accordingly, the potential across the resistor $R_6$ drops due to the increase of the potential at the junction point $J_1$. The reduction of potential across the resistor $R_6$ causes the potential across the UHF bulb $L_u$ to drop below its extinguishing level which causes the bulb $L_u$ to extinguish. The reopening of the switch $S_1$ thus causes the VHF bulb $L_v$ to be illuminated, while the UHF bulb $L_u$ is extinguished.

In the physical implementation of the dial illumination circuits of FIGS. 1 and 2, the illuminator bulbs $L_v$ and $L_u$ would, of course, be disposed in such positions as to provide illumination to the respective VHF and UHF tuner dials $D_v$ and $D_u$. It should also be noted that the switch $S_1$ being a normal component part of the VHF-UHF tuner combination effects the selective operation of the dial illuminator lights $L_v$ and $L_u$ without adding additional cost or complexity to the circuitry.

Although the present invention has been described with a certain degree of particularity, it should be understood that the present disclosure has been made only by way of example and that numerous changes in the details of construction and the combination and arrangement of parts and components may be resorted to without departing from the scope and the spirit of the present invention.

We claim as our invention:

1. A dial illumination circuit for VHF and UHF tuners having a tuner switch for selecting one of the tuners to be operative and to be supplied by a source of direct potential, said dial illumination circuit comprising:
   - a VHF voltage developing circuit connected across said source for developing a first VHF voltage;
   - a VHF dial illuminator light connected to said VHF voltage developing circuit and being responsive to said first VHF voltage to be illuminated thereby when said tuner switch is in a position to render said VHF tuner operative;
   - a UHF voltage developing circuit connected between said source and said tuner switch for developing a first UHF voltage when said tuner switch is in a position to render operative said UHF tuner; and
   - a UHF dial illuminator light connected to said UHF voltage developing circuit and being responsive to said first UHF voltage to be illuminated thereby only when said tuner switch is in a position to render said UHF tuner operative.

2. The dial illumination circuit of claim 1 wherein:
   said VHF voltage developing circuit developing said first VHF voltage when said tuner switch is in a position to render said VHF tuner operative and developing a second VHF voltage when said tuner switch is in a position to render said UHF tuner operative;

said first VHF voltage being of sufficient magnitude to illuminate said VHF dial illuminator light and said second VHF voltage being of insufficient magnitude to illuminate said VHF light;

said UHF voltage developing circuit developing said first UHF voltage when said tuner switch is in a position to render said UHF tuner operative and developing a second UHF voltage when said tuner switch is in a position to render said VHF tuner operative;

said first UHF voltage being of sufficient magnitude to illuminate said UHF dial illuminator light and said second UHF voltage being of insufficient magnitude to illuminate said UHF dial illuminator light.

References Cited

UNITED STATES PATENTS

| | | | |
|---|---|---|---|
| 2,746,029 | 5/1956 | Pfund | 340—282 |
| 2,793,294 | 5/1957 | Thompson | 334—87 |
| 2,860,287 | 11/1958 | Koranye | 315—320 |
| 3,344,308 | 9/1967 | Atkinson | 315—135 |

JOHN W. HUCKERT, *Primary Examiner.*

J. R. SHEWMAKER, *Assistant Examiner.*

U.S. Cl. X.R.

315—313; 334—87